(12) United States Patent
Kao et al.

(10) Patent No.: US 8,242,742 B2
(45) Date of Patent: Aug. 14, 2012

(54) CHARGERS, SYSTEMS AND METHODS FOR DETECTING A POWER SOURCE

(75) Inventors: Han-Jung Kao, Taipei (TW); Guoxing Li, Sunnyvale, CA (US); Ya-Tung Kao, Taipei (TW); Wei Zhang, Shanghai (CN)

(73) Assignee: O2Micro, Inc, Santa Clara, CA (US)

( * ) Notice: Subject to any disclaimer, the term of this patent is extended or adjusted under 35 U.S.C. 154(b) by 691 days.

(21) Appl. No.: 12/156,225

(22) Filed: May 30, 2008

(65) Prior Publication Data

US 2008/0303486 A1  Dec. 11, 2008

Related U.S. Application Data

(60) Provisional application No. 60/933,588, filed on Jun. 6, 2007.

(51) Int. Cl.
*H02J 7/00* (2006.01)
(52) U.S. Cl. .......................... 320/114; 320/106; 320/155
(58) Field of Classification Search .................... 320/114
See application file for complete search history.

(56) References Cited

U.S. PATENT DOCUMENTS

| 7,339,354 B2* | 3/2008 | Sanpei ........................... 320/141 |
| 2005/0144495 A1* | 6/2005 | Nakajima et al. ............. 713/340 |
| 2006/0181241 A1* | 8/2006 | Veselic ......................... 320/107 |
| 2006/0284595 A1 | 12/2006 | Hsieh et al. |
| 2007/0028127 A1* | 2/2007 | Kim .............................. 713/310 |
| 2007/0205802 A1* | 9/2007 | Perisetty ......................... 326/27 |
| 2008/0140887 A1* | 6/2008 | Gallant et al. ................ 710/100 |
| 2008/0215765 A1* | 9/2008 | Butler et al. .................... 710/15 |

FOREIGN PATENT DOCUMENTS

CN  1881738 A  12/2006

* cited by examiner

*Primary Examiner* — Arun Williams (57) ABSTRACT

A charger includes a detection pin, a voltage divider, and a comparator. The detection pin can couple the charger to a power source via a first data line. The voltage divider and the comparator are coupled to the detection pin. The voltage divider divides a power voltage provided by the power source and provides a detection voltage at the detection pin. The comparator compares the detection voltage with a predetermined reference voltage and identifies a type of the power source according to the comparing.

17 Claims, 5 Drawing Sheets

CHARGERS, SYSTEMS AND METHODS FOR DETECTING A POWER SOURCE

RELATED APPLICATION

This application claims priority to U.S. Provisional Application No. 60/933,588, filed on Jun. 6, 2007, which is hereby incorporated by reference in its entirety.

TECHNICAL FIELD

The present invention relates to power supplies for electronic devices.

BACKGROUND

Nowadays, portable electronic apparatuses with a single cell Li-ion/Polymer battery (e.g., mobile phone, MP3/MP4 player, socket charger, etc.) are popular. A USB (universal serial bus) charger which can receive power via a USB interface to charge the battery is widely used in the portable electronic apparatuses. Both USB host and AC (alternating current) adapter can serve as a power source and provide power to the USB charger. The USB charger receives the power and charges the battery. However, the USB host and the AC adapter have different interior structures and can enable the charger to charge the battery with different charging currents. In order to make better use of each power source discriminatingly, some kinds of conventional USB chargers can identify the power source and control the power to charge the battery accordingly. In this instance, two data lines are coupled between the USB host/AC adapter and the conventional USB charger. The USB charger identifies whether the power source is a USB host or an AC adapter by analyzing data received through two data lines.

As a result, two input pins are needed in the conventional USB charger to identify the type of the power source. The IC package of the conventional USB charger can be larger because of the high pin count. Also, the cost of the conventional USB charger can increase with the pin count. Furthermore, the conventional USB charger may need a costly system since data analysis through two data lines can be complicated.

SUMMARY

Embodiments in accordance with the present invention provide apparatuses and methods for providing power source detection. In one embodiment, a charger includes a detection pin, a voltage divider, and a comparator. The detection pin couples the charger to a power source via a first data line. The voltage divider and the comparator are coupled to the detection pin. The voltage divider divides a power voltage provided by the power source and provides a detection voltage at the detection pin. The comparator compares the detection voltage with a predetermined reference voltage and identifies a type of the power source according to the comparing.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Reference will now be made in detail to embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

In one embodiment, a charger which can provide autonomous power source detection includes a detection pin, a voltage divider, and a comparator. The voltage divider can receive an input voltage from the detection pin and provide a detection voltage. The comparator can compare the detection voltage with a predetermined reference voltage, and the charger can identify a type of the power source coupled to the charger according to a comparison result of the comparator. For example, the charger can identify whether the power source is a USB host or an AC adapter.

Figure 1:
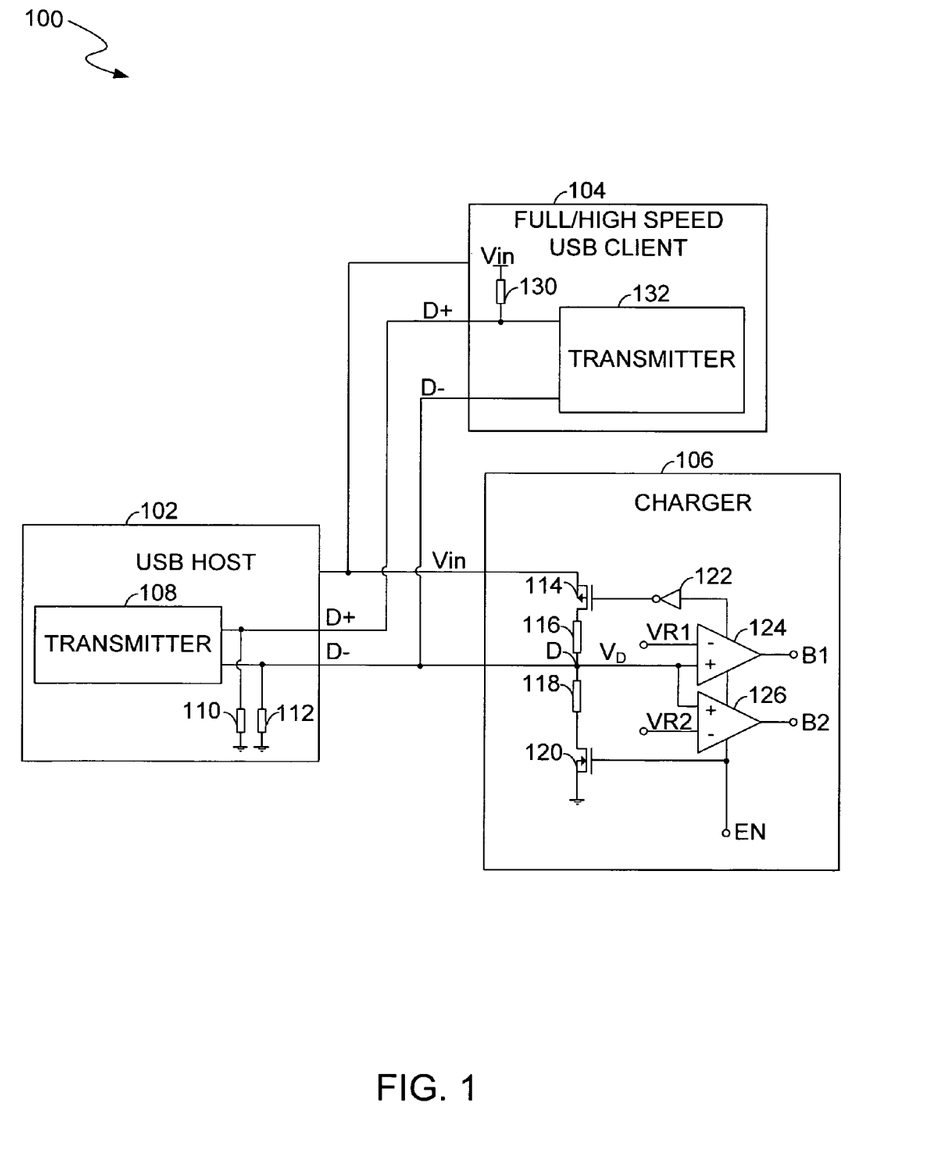
FIG. 1 is a schematic diagram of a charger system according to one embodiment of the present invention.

FIG. 1 illustrates a schematic diagram of a power source detection system 100 according to one embodiment of the present invention. The power source detection system 100 includes a USB host 102, a USB client 104 (e.g., a full/high speed USB client 104), and a charger (e.g., USB charger) 106, in one embodiment. The USB host 102 serves as a power source and provides a power voltage Vin to the charger 106 and the USB client 104. The charger 106 receives the power voltage Vin and charges one or more batteries (not shown in FIG. 1 for purposes of brevity and clarity). The charger 106 can identify whether the power source is a USB host or an AC adapter by monitoring a voltage $V_D$ (detection voltage) on the data line D−. The USB client 104 exchanges data with the USB host 102 via the data lines D+ and D−, in one embodiment.

Furthermore, the USB host 102 includes a transmitter 108, and pull-down resistors 110 and 112, in one embodiment. The transmitter 108 can exchange data with the USB client 104 via the data lines D+ and D−. The pull-down resistor 110 is coupled between the data line D+ and ground. The pull-down resistor 112 is coupled between the data line D− and ground. The resistance of the pull-down resistors 110 and 112 is R1 which can be ranged from (15−15*5%)K Ohm to (15+15*5%)K Ohm, in one embodiment.

Advantageously, the USB host 102 can exchange data with the USB client 104. The USB client 104 can transfer signal and power with three data rates, for example, high-speed, full-speed and low speed. The USB high-speed signaling bit rate is 480 Mbps, the USB full-speed signaling bit rate is 12 Mbps, and the USB low-speed signaling bit rate is 1.5 Mbps, in one embodiment. In one embodiment, the USB client 104 can indicate the data transmitting speed by pulling either the data line D+ or the data line D− by a pull-up resistor. For a full speed or a high speed USB client, the pull-up resistor can be coupled to the data line D+; and for a low speed USB client, the pull-up resistor can be coupled to the data line D−, in one embodiment. In this embodiment, the USB client 104 is a full/high speed USB client which includes a transmitter 132 and a pull-up resistor 130. The transmitter 132 exchanges data with the USB host 102 via the data lines D+ and D−. The pull-up resistor 130 is coupled between the data line D+ and the power voltage Vin. The resistance of the pull-up resistor 130 is R2 which can be ranged from (1.5−1.5*5%)K Ohm to (1.5+1.5*5%)K Ohm, in one embodiment.

The charger 106 includes switches 114 and 120, resistors 116 and 118, an inverter 122, and comparators 124 and 126, in one embodiment. The switch 114 (e.g., a P type metal-oxide-semiconductor field-effect transistor) and the resistor 116 are coupled in series between the power voltage Vin and the data line D−. The resistor 118 and the switch 120 (e.g., an N type metal-oxide-semiconductor field-effect transistor) are coupled in series between the data line D− and ground. The resistor 116 and the resistor 118 are both coupled to the data line D− at the node D. In one embodiment, the resistance of the resistor 116 is R3 and the resistance of the resistor 118 is R4. R3 and R4 each can be much greater than R1 (the resistance of the pull-down resistors 110 and 112), for example, R3=R4=20R1, in order to reduce leakage and to avoid interference from USB data communication. The positive terminals of the comparators 124 and 126 are both connected to the node D and receive the voltage $V_D$ at the node D.

An enable signal EN can enable/disable the switches 114 and 120, and the comparators 124 and 126. The enable signal can be controlled internally (e.g., by an internal controller in the charger 106), or can be controlled externally (e.g., by a user). The enable signal EN can be sent to the switch 120 and the comparators 124 and 126 directly, and to the switch 114 through the inverter 122. In one embodiment, when the power voltage Vin is greater than an under-voltage lockout (UVLO) voltage (e.g., 3V) and the enable signal EN is high, the switches 114 and 120 are switched on and the comparators 124 and 126 are enabled. As a result, the charger 106 is enabled to conduct power source detection. Furthermore, after the power source detection, the enable signal EN can be set to low to switch off the switches 114 and 120 and to disable the comparators 124 and 126, in one embodiment. As such, data communication between a power source (e.g., USB host 102) and a USB client (e.g., full/high speed USB client 104) may not be interfered by the charger 106.

Advantageously, the charger 106 can identify that the power source is a USB host and the USB client is a full/high speed USB client by monitoring the voltage $V_D$ (detection voltage) at the node D (detection pin), in one embodiment. When the charger 106 is enabled to conduct the power source detection, the voltage $V_D$ at the node D can be determined by a voltage divider including the resistors 112, 116, and 118. At the node D, the voltage divider divides the power voltage Vin to the voltage $V_D$. The resistors 112 and 118 are coupled in parallel with each other between the node D and ground. The resistor 116 is coupled between power voltage Vin and the node D. As such, the voltage $V_D$ can be given by:

$$V_D = \frac{R1\|R4}{R3+R1\|R4}Vin = \frac{\frac{R1\cdot R4}{R1+R4}}{R3+\frac{R1\cdot R4}{R1+R4}}Vin = \frac{\frac{15\times 300}{15+300}}{300+\frac{15\times 300}{15+300}}Vin = \frac{1}{22}Vin$$

In one embodiment, the resistance R1 of the resistors 112 and 110 is 15K Ohm, the resistance R2 of the resistor 130 is 1.5 k Ohm, the resistance R3 of the resistor 116 is set to be R3=20R1=300K Ohm, and the resistance R4 of the resistor 118 is set to be R4=20R1=300K Ohm.

The comparator 124 compares the voltage $V_D$ with a predetermined reference voltage VR1 at a negative terminal of the comparator 124. The comparator 126 compares the voltage $V_D$ with a predetermined reference voltage VR2 at a negative terminal of the comparator 126. In one embodiment, the predetermined reference voltage VR1 is set to be 0.1 Vin and the predetermined reference voltage VR2 is set to be 0.95 Vin. In such one embodiment, since the voltage $V_D$ is equal to $$\frac{1}{22}Vin,$$

output B1 of the comparator 124 is logic 0 and output B2 of comparator 126 is logic 0.

Figure 2:
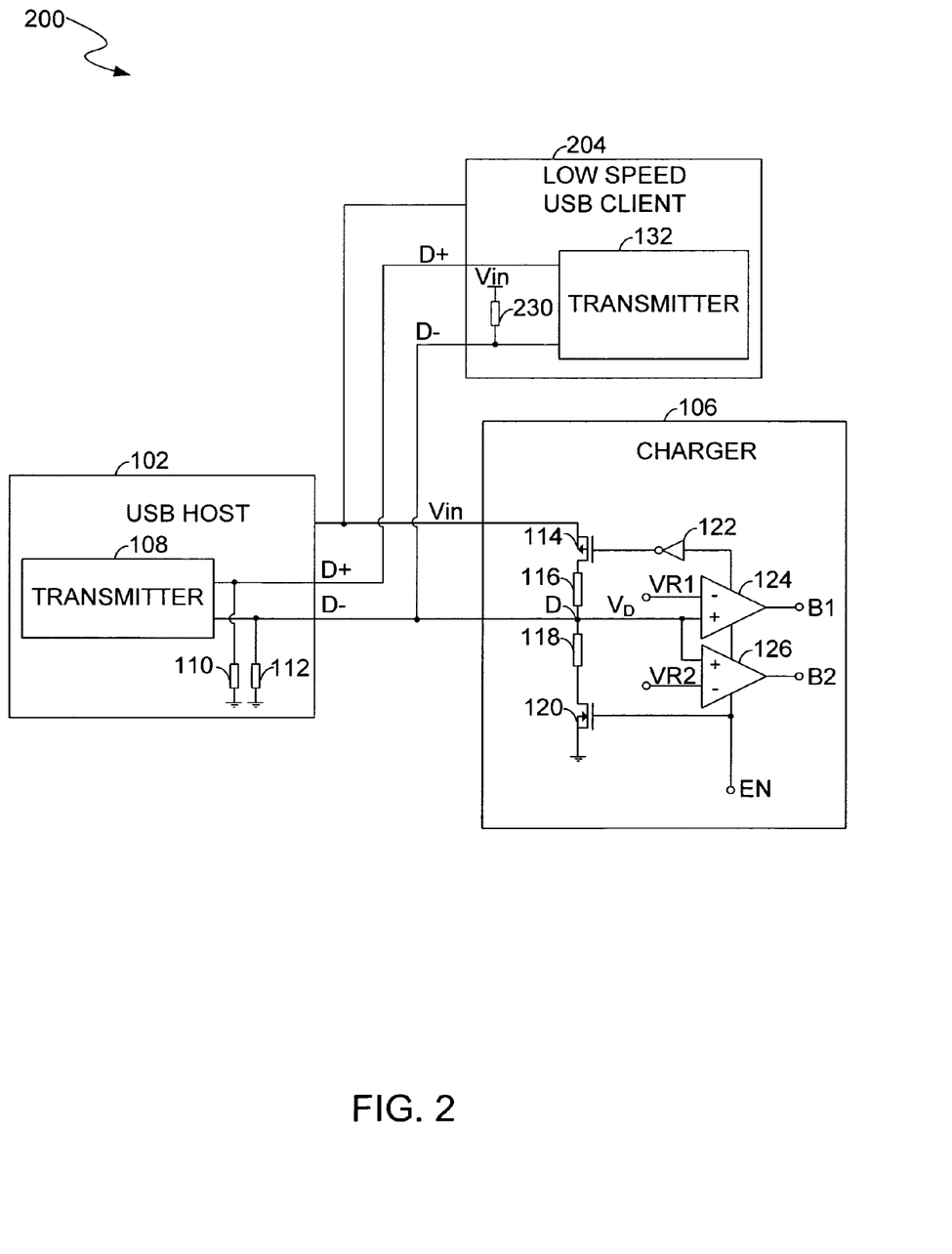
FIG. 2 is a schematic diagram of a charger system according to another embodiment of the present invention.

FIG. 2 illustrates a schematic diagram of a charger system 200 according to another embodiment of the present invention. Elements labeled the same in FIG. 1 have similar functions and will not be repetitively described herein for purposes of brevity and clarity. The charger system 200 includes a USB host 102, a USB client 204, (e.g., a low speed USB client 204), and a charger (e.g., USB charger) 106, in one embodiment. The low speed USB client 204 includes a transmitter 132 and a pull-up resistor 230. As mentioned before, for a low speed USB client, the pull-up resistor 230 is coupled between the data line D− and the power voltage Vin. The resistance of the pull-up resistor 230 is R2 which can be ranged from (1.5−1.5*5%)K Ohm to (1.5+1.5*5%)K Ohm, in one embodiment.

Advantageously, the charger 106 can identify that the power source is a USB host and the USB client is a low speed USB client by monitoring a voltage $V_D$ (detection voltage) at the node D (detection pin) on the data line D−, in one embodiment. In one embodiment, the voltage $V_D$ at the node D is determined by a voltage divider including the resistors 112, 230, 116, and 118. At the node D, the voltage divider divides the power voltage Vin to the voltage $V_D$. The resistors 112 and 118 are coupled in parallel with each other between the node D and ground. The resistors 116 and 230 are coupled in parallel with each other between the power voltage Vin and the node D. As such, the voltage $V_D$ can be given by:

$$V_D = \frac{R1\|R4}{R2\|R3+R1\|R4}Vin = \frac{\frac{R1\cdot R4}{R1+R4}}{\frac{R2\cdot R3}{R2+R3}+\frac{R1\cdot R4}{R1+R4}}Vin = \frac{\frac{15\times 300}{15+300}}{\frac{1.5\times 300}{1.5+300}+\frac{15\times 300}{15+300}}Vin \approx 0.9\ Vin$$

In one embodiment, the resistance R1 of the resistors 112 and 110 is 15K Ohm, the resistance R2 of the resistor 230 is 1.5 k Ohm, the resistance R3 of the resistor 116 is set to be R3=20R1=300K Ohm, the resistance R4 of the resistor 118 is set to be R4=20R1=300K Ohm.

Similarly, the comparator 124 compares the voltage $V_D$ with the predetermined reference voltage VR1. The comparator 126 compares the voltage $V_D$ with the predetermined reference voltage VR2. In one embodiment, the predetermined reference voltage VR1 is set to be 0.1 Vin and the predetermined reference voltage VR2 is set to be 0.95 Vin. Since the voltage $V_D$ is equal to 0.9 Vin, output B1 of the comparator 124 is logic 1 and output B2 of comparator 126 is logic 0, in one embodiment.

Figure 3:
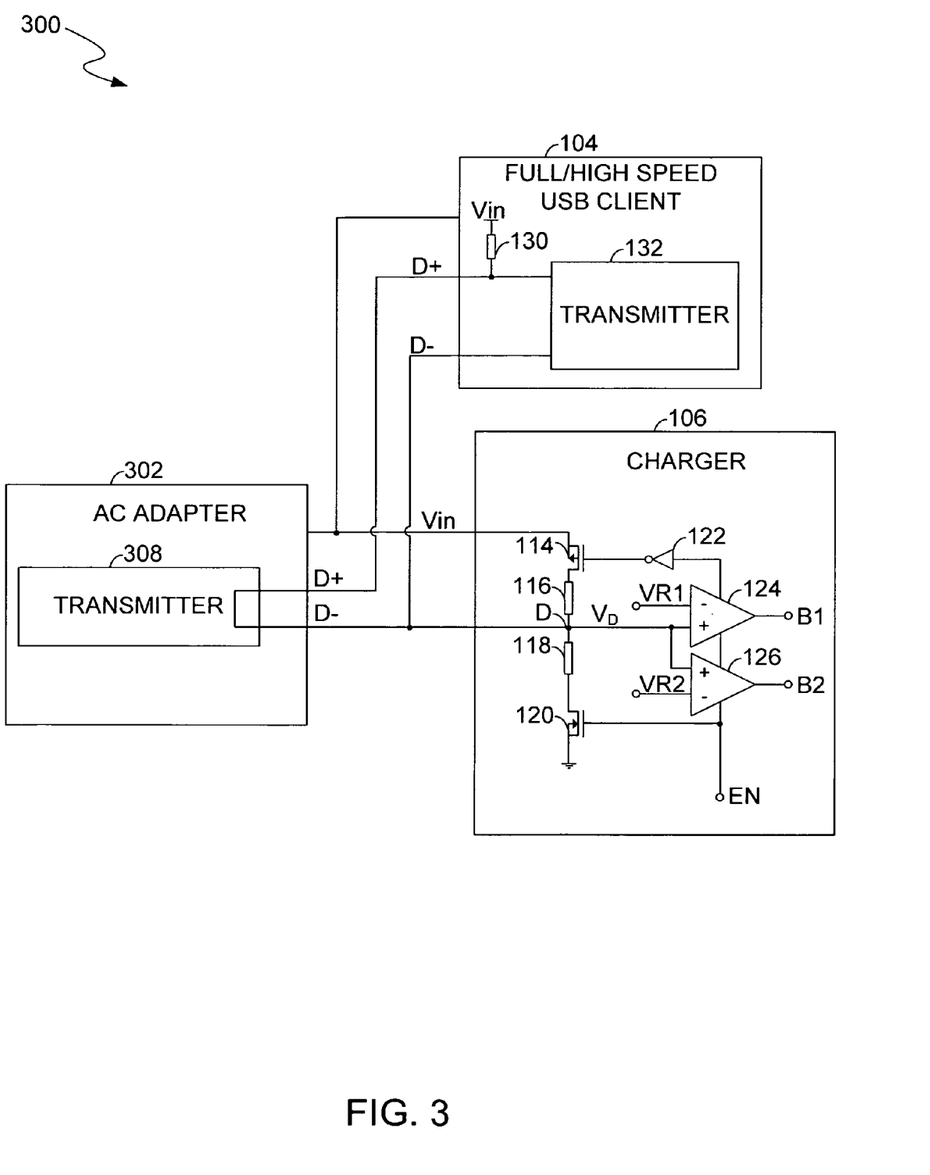
FIG. 3 is a schematic diagram of a charger system according to another embodiment of the present invention.

FIG. 3 illustrates a schematic diagram of a charger system 300 according to another embodiment of the present invention. Elements labeled the same in FIG. 1 and FIG. 2 have similar functions and will not be repetitively described herein for purposes of brevity and clarity. The power source detection system 300 includes an AC adapter 302, a USB client 104 (e.g., a full/high speed USB client 104), and a charger (e.g., USB charger) 106, in one embodiment. The AC adapter (e.g., an AC adapter in a phone system) 302 serves as a power source and provides a power voltage Vin to the charger 106 and the USB client 104. The AC adapter 302 includes a transmitter 308 which can exchange data with the USB client 104 via the data lines D+ and D−. Furthermore, the data lines D+ and D− are connected with each other in the AC adapter 302, in one embodiment. The charger 106 receives the power voltage Vin and charges one or more batteries (not shown in FIG. 3 for purposes of brevity and clarity). Similarly, the charger 106 can identify whether the power source is a USB host or an AC adapter via the data line D−.

Advantageously, the charger 106 can identify that the power source is an AC adapter by monitoring a voltage $V_D$ (detection voltage) at the node D (detection pin) on the data line D−, in one embodiment. Since in an AC adapter the data line D+ and D− are connected together, the voltage $V_D$ is approximately equal to the power voltage Vin, in one embodiment. More specifically, the voltage $V_D$ at the node D is determined by a voltage divider including the resistors 130, 116, and 118, in one embodiment. At the node D, the voltage divider divides the power voltage Vin to the voltage $V_D$. The resistor 118 is coupled between the node D and ground. The resistors 116 and 130 are coupled in parallel with each other between the power voltage Vin and the node D. As such, the voltage $V_D$ can be given by:

$$V_D = \frac{R4}{R4 + R2\|R3} Vin = \frac{R4}{R4 + \frac{R2 \cdot R3}{R2 + R3}} Vin = \frac{300}{300 + \frac{1.5 \times 300}{1.5 + 300}} Vin \approx 0.995 \, Vin$$

In one embodiment, the resistance R2 of the resistor 130 is 1.5 k Ohm, the resistance R3 of the resistor 116 is 300K Ohm, the resistance R4 of the resistor 118 is 300K Ohm.

Similarly, the comparator 124 compares the voltage $V_D$ with the predetermined reference voltage VR1. The comparator 126 compares the voltage $V_D$ with the predetermined reference voltage VR2. In one embodiment, the predetermined reference voltage VR1 is set to be 0.1 Vin and the predetermined reference voltage VR2 is set to be 0.95 Vin. Since the voltage $V_D$ is equal to 0.995 Vin, output B1 of the comparator 124 is logic 1 and output B2 of comparator 126 is logic 1, in one embodiment.

Figure 4:
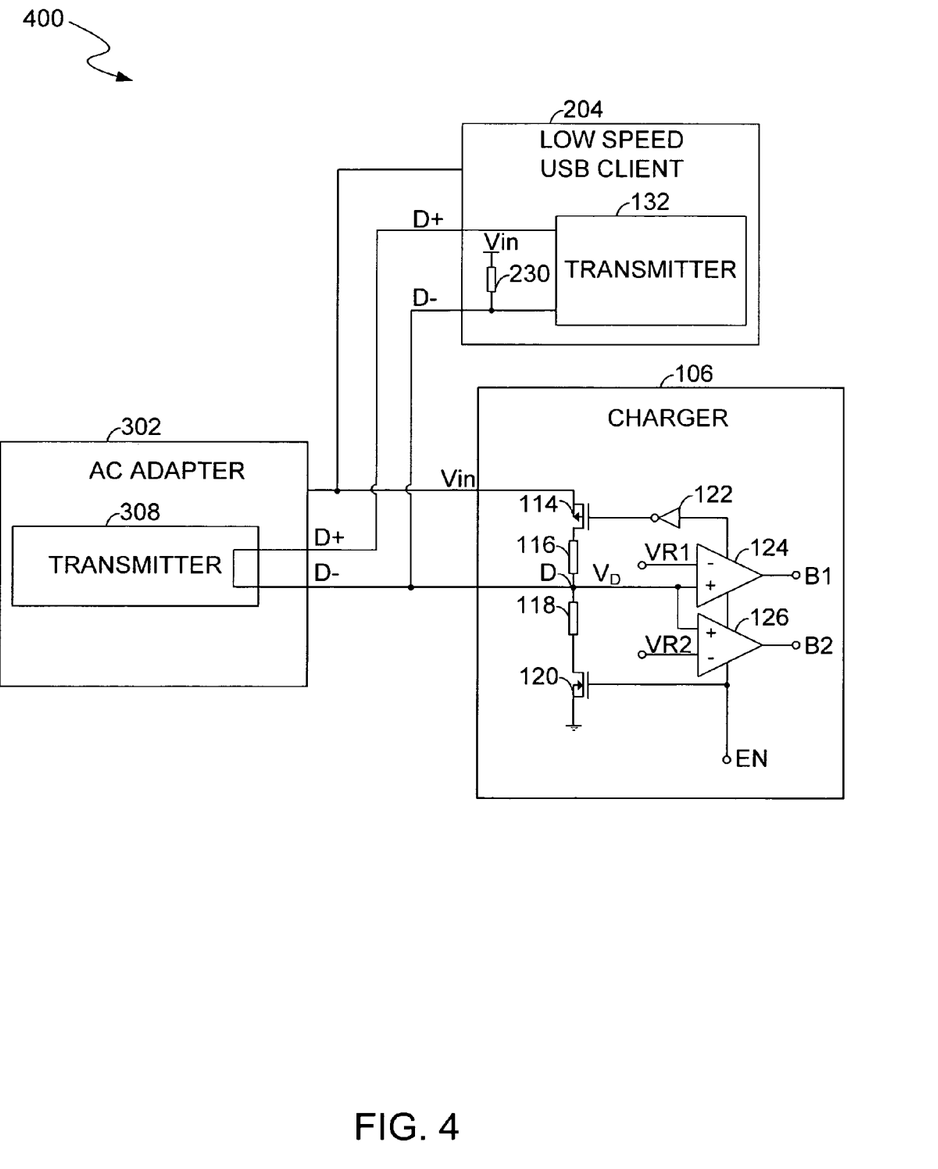
FIG. 4 is a schematic diagram of a charger system according to another embodiment of the present invention.

FIG. 4 illustrates a schematic diagram of a charger system 400 according to another embodiment of the present invention. Elements labeled the same in FIG. 1, FIG. 2 and FIG. 3 have similar functions and will not be repetitively described herein for purposes of brevity and clarity. The power source detection system 400 includes an AC adapter 302, a USB client 204 (e.g., a low speed USB client 204), and a charger (e.g., USB charger) 106, in one embodiment.

Similarly, the charger 106 can identify that the power source is an AC adapter by monitoring a voltage $V_D$ (detection voltage) at the node D (detection pin) on the data line D−, in one embodiment. Since for an AC adapter, the data line D+ and D− are connected together, the voltage $V_D$ can be approximately equal to the power voltage Vin as described in relation to FIG. 3. The comparator 124 compares the voltage $V_D$ with the predetermined reference voltage VR1. The comparator 126 compares the voltage $V_D$ with the predetermined reference voltage VR2. In one embodiment, the predetermined reference voltage VR1 is set to be 0.1 Vin and the predetermined reference voltage VR2 is set to be 0.95 Vin. Since the voltage $V_D$ is approximately equal to the power voltage Vin, output B1 of the comparator 124 is logic 1 and output B2 of comparator 126 is logic 1, in one embodiment.

Advantageously, the charger 106 can detect/identify a type of the power source and a type of the USB client (e.g., full/high speed or low speed) autonomously by monitoring a voltage $V_D$ (detection voltage) at the node D (detection pin) from a single data line D−. The outputs B1 and B2 of the comparators 124 and 216 can indicate a detection result. In other words, the charger 106 can detect/identify a type of a power source and a speed type of a USB client according to the outputs (B1 and B2) of the comparators 124 and 216. TABLE 1 shows an exemplary relationship among the type of a power source, the speed of a USB client, and outputs B1 and B2, in one embodiment.

TABLE 1

| Type of Power Source | Speed Type of USB Client | B1 | B2 |
|---|---|---|---|
| USB host | full/high speed | 0 | 0 |
| USB host | low speed | 1 | 0 |
| AC adapter | full/high speed | 1 | 1 |
| AC adapter | low speed | 1 | 1 |

As shown in TABLE 1, B1 indicates a speed type of a USB client if B2 is logic 0, in one embodiment. For example, if B2 is logic 0, the USB client is identified as a full/high speed USB client if B1 is logic 0. If B2 is logic 0, the USB client is identified as a low speed USB client if B1 is logic 1. B2 indicates whether the power source is a USB host or an AC adapter, in one embodiment. For example, if B2 is logic 0, the power source is identified as a USB host. If B2 is logic 1, the power source is identified as an AC adapter.

Advantageously, as shown in FIG. 1-FIG. 4, the charger 106 can detect/identify a type of the power source and a speed type of the USB client by monitoring a voltage $V_D$ from the data line D− and/or sensing the outputs of B1 and B2. In one embodiment, the voltage $V_D$ on data line D− will be monitored, for example, 5 ms (millisecond) after the charger 106 is powered on (e.g., when the power voltage Vin provided to the charger 106 is greater than an under-voltage lockout (UVLO) voltage). In one embodiment, the charger 210 will be enabled within a certain period (e.g., 100 ms) to monitor the voltage $V_D$ for several times (e.g., 3 times in 100 ms) in order to provide a relatively accurate detection. The charger 106 can also be coupled to the data line D+ instead of the data line D−, thereby detecting/identifying the power source and the speed type of the USB client by monitoring a voltage on the data line D+.

Although specific values of the resistors and reference voltages are disclosed in the present disclosure, such values are exemplary. Resistance of resistors 110, 112, 130, and 230 can be set to other values according to different embodiments of the present invention. Resistance of resistors 116 and 118, the predetermined reference voltages VR1 and VR2 can also be set to other values as long as the functions of the present invention are achieved. Advantageously, a charging current can be controlled according to the type of the power source, in one embodiment. For example, if a USB host power source is detected, a charging current can be set to be less than 500 mA (milliampere). If an AC adapter power source is detected, a charging current can be set to be greater than 500 mA (e.g., 1200 mA).

To summarize, Embodiments in accordance with the present invention provide a charger 106 which can detect/ identify a type of power source (e.g., a USB host or an AC adapter) and a type of a USB client (e.g., a high/full speed USB client or a low speed USB client) autonomously by monitoring a voltage from a single data line from the power source. As such, the power source detection may only occupy one pin of the charger 106 and thereby a lower pin count of the IC package of the charger 106 can be achieved. Furthermore, the charger 106 can achieve power source detection and USB client speed type recognition in a relatively efficient way. As a result, the charger 106 of the present invention can reduce costs and enhance efficiency.

Figure 5:
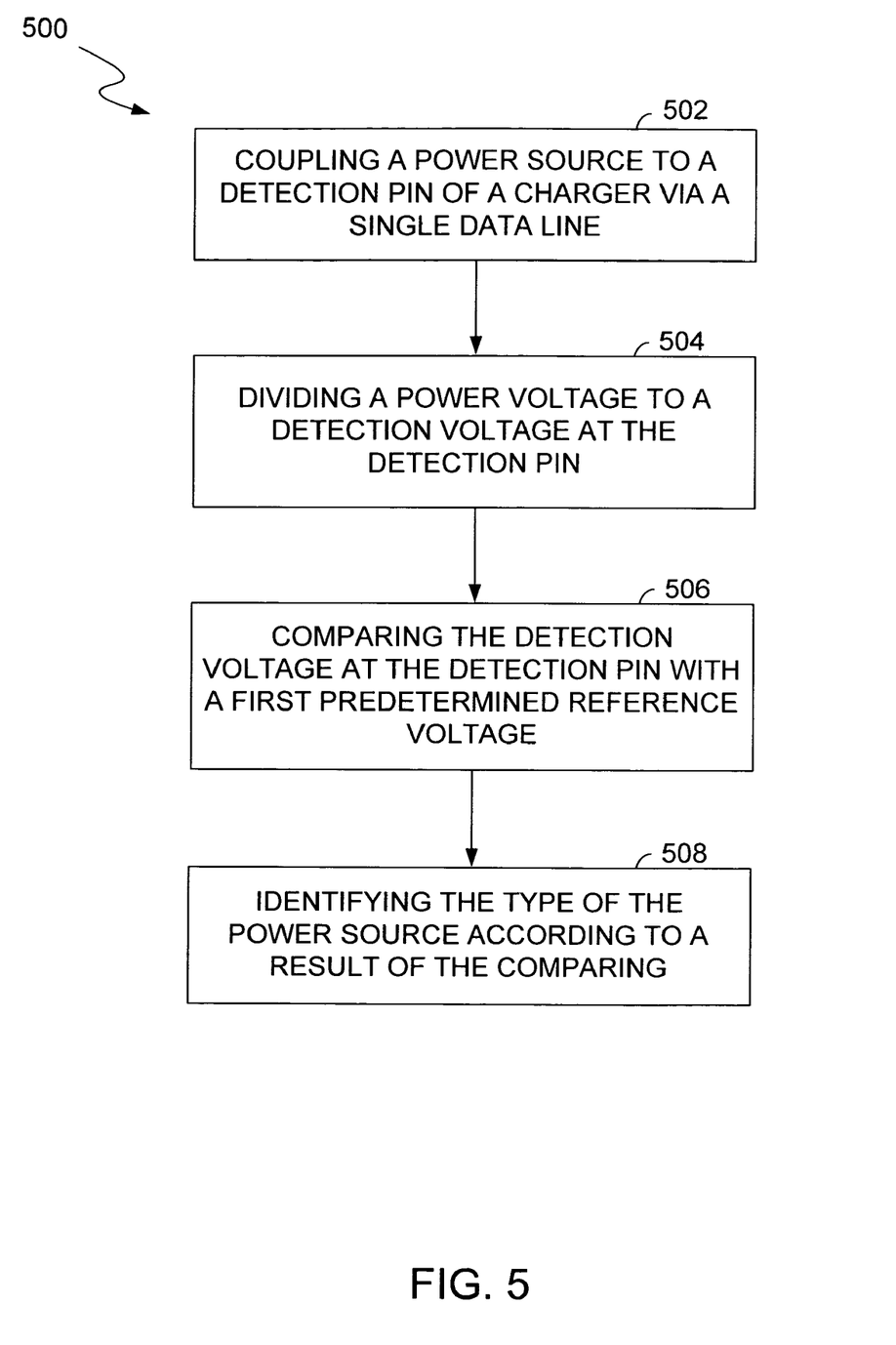
FIG. 5 is a flowchart of a method for power source detection according to one embodiment of the present invention.

FIG. 5 illustrates a flowchart 500 of a method for power source detection according to one embodiment of the present invention. Although specific steps are disclosed in FIG. 5, such steps are exemplary. That is, the present invention is well suited to performing various other steps or variations of the steps recited in FIG. 5. FIG. 5 is described in combination with FIG. 1-FIG. 4.

In block 502, a power source is coupled to a detection pin of a charger via a single data line. In one embodiment, the power source (e.g., USB host 102 or AC adapter 302) is coupled to the detection pin (node D) of the charger 106 via the data line D−.

In block 504, a power voltage received from the power source is divided to a detection voltage at the detection pin. In one embodiment, resistors 116 and 118 cooperating with a pull-down resistor (if exists) in the power source (e.g., pull-down resistor 112 in the USB host 102) and/or a pull-up resistor in the USB client (e.g., pull-up resistor 130 in a full/high speed USB client or pull-up resistor 230 in a low speed USB client) divide the power voltage Vin to a voltage $V_D$ at the detection pin (node D).

In block 506, the detection voltage at the detection pin is compared with a first predetermined reference voltage. In one embodiment, the voltage $V_D$ at the detection pin (node D) is compared with a predetermined reference voltage VR2 by a comparator 126.

In block 508, the type of the power source is identified according to a result of the comparing. In one embodiment, an output B2 of the comparator 126 will be checked. If the output B2 is logic 0, the power source can be identified as a USB host. If the output B2 is logic 1, the power source can be identified as an AC adapter.

Furthermore, if the power source is identified as a USB host, the detection voltage at the detection pin is compared with a second predetermined reference voltage. In one embodiment, if the output B2 is logic 0, the voltage $V_D$ at the detection pin (node D) can be compared with a predetermined reference voltage VR1 by a comparator 124. The speed type of a USB client can be identified according to a result of the comparing. If an output B1 of the comparator 124 is logic 0, the USB client can be identified as a full/high speed USB client. If the output B1 is logic 1, the USB client can be identified as a low speed USB client.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method for detecting a power source which is selected from the group consisting of a universal serial bus (USB) host and an alternating current (AC) adapter, said method comprising:

receiving a power voltage from a power line of said power source;

exchanging data via a first data line and a second data line between said power source and a USB client;

generating a detection voltage on said first data line by a voltage divider, wherein said voltage divider comprises a first resistor coupled between a power pin and a detection pin, and a second resistor coupled between said detection pin and ground, wherein said power source comprises a transmitter in which said first data line and said second data line are coupled to each other if said power source is said AC adapter, and wherein said USB client comprises a third resistor;

determining a voltage level of said detection voltage according to resistance values of said first resistor, said second resistor and said third resistor if said power source is said AC adapter;

comparing said detection voltage on said data line with a first predetermined reference voltage; and identifying whether said power source is said USB host or said AC adapter according to a result of said comparing of said detection voltage with said first predetermined reference voltage.

2. The method of claim 1, further comprising:

comparing said detection voltage with a second predetermined reference voltage; and identifying a type of said USB client coupled to said first data line according to a result of said comparing of said detection voltage with said second predetermined reference voltage.

3. The method of claim 1, wherein said third resistor is coupled to said second data line.

4. The method of claim 3, wherein said USB host comprises a fourth resistor coupled to said first data line, and wherein said determining step further comprising:

determining said voltage level according to resistance values of said first resistor, said second resistor and said fourth resistor if said power source is said USB host.

5. The method of claim 1, wherein said third resistor is coupled to said first data line.

6. The method of claim 5, wherein said USB host comprises a fourth resistor coupled to said first data line, and wherein said determining step further comprising:

determining said voltage level according to resistance values of said first resistor, said second resistor, said third resistor and said fourth resistor if said power source is said USB host.

7. A charger comprising:

a power pin coupled to a power line of a power source, said power pin receiving a power voltage provided by said power source, said power source is selected from the group consisting of a universal serial bus (USB) host and an alternating current (AC) adapter;

a detection pin coupled to a first data line of said power source, said first data line and a second data line transferring data between said power source and a USB client;

a voltage divider coupled to said detection pin and said power pin, said voltage divider comprising a first resistor coupled between said power pin and said detection pin, and a second resistor coupled between said detection pin and ground, and providing a detection voltage at said detection pin by dividing said power voltage at said power pin according to resistors in said power source and said USB client; and a first comparator coupled to said detection pin, said first comparator comparing said detection voltage at said detection pin with a first predetermined reference voltage and identifying whether said power source is said USB host or said AC adapter according to a result of said comparison, wherein said power source comprises a transmitter in which said first data line and said second data line are coupled to each other if said power source is said AC adapter, wherein said USB client comprises a third resistor coupled to said first data line, and wherein said voltage divider provides said detection voltage by dividing said power voltage according to resistance values of said first resistor, said second resistor and said third resistor if said power source is said AC adapter.

8. The charger of claim 7, wherein said voltage divider is coupled to said power pin via a first switch and is coupled to ground via a second switch.

9. The charger of claim 7, wherein said USB client receives said power voltage via said power line.

10. The charger of claim 7, further comprising:
a second comparator coupled to said detection pin, said second comparator identifying a type of said USB client by comparing said detection voltage with a second predetermined reference voltage.

11. The charger of claim 7, wherein said USB client is selected from a group consisting of: a full speed USB client, a high speed USB client, and a low speed USB client.

12. The charger of claim 7, wherein a charging current is set by said charger according to said identification of said power source.

13. The charger of claim 7, wherein said power source comprises a fourth resistor coupled to said first data line if said power source is said USB host, and wherein said voltage divider provides said detection voltage by dividing said power voltage according to resistance values of said first resistor, said second resistor, said third resistor and said fourth resistor if said power source is said USB host.

14. A system comprising:
a power source providing a power voltage on a power line, wherein said power source is selected from the group consisting of a universal serial bus (USB) host and an alternating current (AC) adapter;
a USB client receiving said power voltage from said power line and exchanging data with said power source via a first data line and a second data line; and
a charger coupled to said power line and said first data line, said charger receiving said power voltage from said power line, dividing said power voltage on said power line to a detection voltage on said first data line according to resistors in said power source and said USB client, identifying whether said power source is said USB host or said AC adapter by comparing said detection voltage with a first predetermined reference voltage, and identifying a type of said USB client by comparing said detection voltage with a second predetermined reference voltage, wherein said charger comprises a first resistor coupled between said power line and said first data line, and a second resistor coupled between said first data line and ground, wherein said power source comprises a third resistor coupled to said first data line if said power source is said USB host and wherein said power source comprises a transmitter in which said first data line and said second data line are coupled to each other if said power source is said AC adapter, wherein said USB client comprises a fourth resistor coupled to said second data line, wherein said voltage divider provides said detection voltage by dividing said power voltage according to resistance values of said first resistor, said second resistor and said third resistor if said power source is said USB host, and wherein said voltage divider provides said detection voltage by dividing said power voltage according to resistance values of said first resistor, said second resistor and said fourth resistor if said power source is said AC adapter.

15. A system comprising:
a power source providing a power voltage on a power line, wherein said power source is selected from the group consisting of a universal serial bus (USB) host and an alternating current (AC) adapter;
a USB client receiving said power voltage from said power line and exchanging data with said power source via a first data line and a second data line; and
a charger coupled to said power line and said first data line, said charger receiving said power voltage from said power line, dividing said power voltage on said power line to a detection voltage on said first data line according to resistors in said power source and said USB client, identifying whether said power source is said USB host or said AC adapter by comparing said detection voltage with a first predetermined reference voltage, and identifying a type of said USB client by comparing said detection voltage with a second predetermined reference voltage, wherein said charger comprises a first resistor coupled between said power line and said first data line, and a second resistor coupled between said first data line and ground, wherein said power source comprises a third resistor coupled to said first data line if said power source is said USB host and wherein said power source comprises a transmitter in which said first data line and said second data line are coupled to each other if said power source is said AC adapter, wherein said USB client comprises a fourth resistor coupled to said first data line, wherein said voltage divider provides said detection voltage by dividing said power voltage according to resistance values of said first resistor, said second resistor, said third resistor and said fourth resistor if said power source is said USB host, and wherein said voltage divider provides said detection voltage by dividing said power voltage according to resistance values of said first resistor, said second resistor and said fourth resistor if said power source is said AC adapter.

16. A charger comprising:
a power pin coupled to a power line of a power source, said power pin receiving a power voltage provided by said power source, said power source is selected from the group consisting of a universal serial bus (USB) host and an alternating current (AC) adapter;
a detection pin coupled to a first data line of said power source, said first data line and a second data line transferring data between said power source and a USB client;
a voltage divider coupled to said detection pin and said power pin, said voltage divider comprising a first resistor coupled between said power pin and said detection pin, and a second resistor coupled between said detection pin and ground, and providing a detection voltage at said detection pin by dividing said power voltage at said power pin according to resistors in said power source and said USB client; and a first comparator coupled to said detection pin, said first comparator comparing said detection voltage at said detection pin with a first predetermined reference voltage and identifying whether said power source is said USB host or said AC adapter according to a result of said comparison, wherein said power source comprises a transmitter in which said first data line and said second data line are coupled to each other if said power source is said AC adapter, wherein said USB client comprises a third resistor coupled to said second data line, and wherein said voltage divider provides said detection voltage by dividing said power voltage according to resistance values of said first resistor, said second resistor and said third resistor if said power source is said AC adapter.

17. The charger of claim 16, wherein said power source comprises a fourth resistor coupled to said first data line if said power source is said USB host, and wherein said voltage divider provides said detection voltage by dividing said power voltage according to resistance values of said first resistor, said second resistor and said fourth resistor if said power source is said USB host.

* * * * *